Patented Aug. 13, 1935

2,011,074

UNITED STATES PATENT OFFICE 2,011,074

METHOD OF PROCESSING CHEESE

Richard Pasternack and Richard W. Burnham, Brooklyn, N. Y., assignors to Charles Pfizer & Company, Brooklyn, N. Y., a corporation of New Jersey No Drawing. Application November 16, 1932, Serial No. 642,930

13 Claims. (Cl. 99—11)

This invention relates to cheese and the method of processing same and more particularly to emulsifying agents adapted for use in processing cheese, and is a continuation in part of our copending application, Ser. No. 461,041, filed June 13, 1930.

Most of the cheeses found on the market today have been processed. This processing comprises giving the cheese a heat treatment at a temperature high enough to destroy undesirable bacteria but not high enough to disintegrate the cheese. Generally the cheese is kept at a temperature from about 140° F. to 175° F. for half an hour or so. This processing sterilizes the cheese, greatly reducing its tendency to decay, and furthermore, improves the texture and appearance of the cheese. In some cases different kinds of cheese are blended in this processing to give a cheese of improved flavor and more uniform and homogeneous texture. Also, in the case of Camembert, Brie, and other cheeses of extremely soft consistency, it is advantageous to blend a firmer cheese with the soft cheese to obtain a cheese of firmer character which can be more conveniently packed and served on the table.

In this processing of cheese, the cheese is reduced to a more or less plastic state and the fat constituent of the cheese in this state has a tendency to separate out and thereby ruin the uniform texture of the finished cheese. This tendency has heretofore been overcome by constantly stirring the cheese and adding to it a small amount of an emulsifying agent. In this manner, a finished cheese is obtained of uniform and homogeneous texture.

Disodium phosphate, Rochelle salts, and trisodium citrate have been commonly used as emulsifying agents for this purpose. These salts, as well as others proposed for this purpose, have not proved satisfactory because they slowly form insoluble calcium salts by reaction with the calcium caseinate in the cheese, and in the course of time, definite crystalline aggregates of these insoluble calcium salts separate from the cheese, producing a most undesirable grit in the finished cheese.

We have now discovered that the gamma and delta lactones of gluconic acid, or a mixture of the same proportioned to give a desirable slowness of hydrolysis, are particularly suited for use as emulsifying agents in the processing of cheese. Both of the lactones obtainable from gluconic acid by various methods of dehydration may be used for this purpose, and the term "glucono lactone" as used herein and in the claims, includes both the gamma and the delta lactones obtainable by dehydrating gluconic acid or any mixture of these.

These glucono lactones have all the advantageous properties of the salts heretofore used for this purpose, and, furthermore, the very material added advantage that they remain dispersed in the cheese, and do not form crystalline aggregates, or grits. Also, when these materials are used in small quantity with the known emulsifying agents, the formation of grits and/or relatively insoluble calcium salts is reduced.

When a glucono lactone is used in the processing of cheese, emulsification is brought about by means of the unhydrolyzed lactone, but during the process of emulsifying and sterilizing a certain amount of hydrolysis of the lactone to gluconic acid also takes place. Glucono-gamma-lactone is preferred because it hydrolyzes more slowly than glucono-delta-lactone, but both eventually form gluconic acid, some or all of which we believe gradually reacts with the calcium caseinate of the cheese to form calcium gluconate. This latter reaction is entirely independent of the emulsification process. The calcium gluconate reaction product is relatively soluble and easily assimilable.

Cheese may be processed using glucono lactones in the same manner as cheeses are now processed using phosphates, tartrates, citrates, ets., as emulsifying agents. Glucono lactones are especially suited for use as emulsifying agents in processing of cheese because they give a more stable emulsion of fat and protein in the cheese and, consequently, a better texture in the finished product and wider range of selection of cheeses which may be blended to a uniform composite cheese.

Another advantage of the use of glucono lactones is that the final hydrogen ion concentration and titratable acidity of the cheese can be adjusted to the optimum value, a pH of 5.5 to 6.0 generally being considered most suitable. In this way it is possible to convert cheeses of too high or too low an acidity which are unsatisfactory in texture and flavor, into marketable products. The adjustment is best accomplished after completing the emulsification of the cheese by the addition of neutralizing agents such as sodium carbonate, ammonium carbonate, ammonia, etc. In calculating the required quantity of neutralizing agent, due allowance should be made for the acid value of the gluconic acid or its lactone. Where the cheese is too alkaline, the adjustment can be made by the addition of glucono lactone alone.

The proportion of glucono lactones to cheese, where one of such is used as the sole emulsifying agent, may vary from 0.1% to 2.0% by weight of the cheese. In general, 0.5% of the lactone is equivalent to about 1.0% of trisodium citrate or 2.0% of Rochelle salts, common emulsifying agents heretofore used, and, consequently the proportion of lactone to be used in any particular case can readily be determined by ascertaining the proportion of one of those emulsifying agents heretofore used in processing cheese. The proportion of lactone will also be influenced if the cheese to be processed is too alkaline and the pH value is to be adjusted through the acid value of the lactone.

Glucono lactones may also be used advantageously as emulsifying agents in processing cheese in conjunction with salts heretofore used such as trisodium citrate, Rochelle salts, disodium phosphate, etc. or with soluble gluconates claimed in our co-pending application, Ser. No. 461,041. As little as 0.05% by weight of glucono lactones have an appreciable effect when used with the above mentioned salts, increasing the stability of the resulting emulsion of protein and fat in the cheese, and, consequently, improving the texture of the cheese. The amount of the above mentioned salts used can generally be decreased proportionately as the amount of lactone used is increased, according to the above stated equivalents, subject to variations in the particular cheese being treated.

The processing of cheese using glucono lactones as emulsifying agents may be carried out as heretofore done with known emulsifying agents for this purpose. The following example is given to illustrate the processing of cheese where the pH value had to be adjusted:

*Example I*

Two cheeses which could not be successfully processed by heretofore known emulsifying agents, were selected. One was a sour cheese having a pH value of 4.75, entirely too high an acidity for acceptable cheese, the other was a wet curd cheese having a pH value of 5.5. Equal weights of both cheeses were taken, the average pH value being 5.125, an acidity which is generally considered slightly too high, and put through an ordinary meat grinder, at the same time feeding into the mixture 0.5% of glucono $\gamma$-lactone by weight of the cheese and 0.5% of sodium chloride, the lactone and salt being dissolved in sufficient water to give the finished cheese a water content of 40%, 3% more water being introduced at this point to compensate for loss due to evaporation in the processing to follow.

The ground mixture was then passed through a colander to give it greater uniformity and then placed in a steam jacketed kettle equipped with an eccentric motion agitator. The cheese was raised to a temperature of about 160° F. and the agitator run rapidly for five minutes at the end of which time the emulsification of the cheese was complete. The agitator was slowed down and the temperature of about 160° F. maintained for fifteen minutes longer to effect satisfactory sterilization. About two minutes before the cheese was withdrawn 0.5% of ammonium carbonate by weight of the cheese was added in the form of a concentrated aqueous solution and stirred in thoroughly. The cheese was then withdrawn from the kettle.

The processed cheese had a perfectly smooth, homogeneous texture, showed a pH of 5.7, and was highly satisfactory in every respect.

The invention claimed is:
1. A cheese emulsifying agent containing a mixture of glucono-gamma lactone and glucono-delta-lactone.
2. A cheese emulsifying agent containing a mixture of glucono-lactone and a non-poisonous soluble salt selected from the group consisting of citrates, tartrates, phosphates and gluconates.
3. A cheese emulsifying agent containing a mixture of a non-poisonous soluble salt selected from the group consisting of citrates, tartrates, phosphates and gluconates, and a minor amount of a glucono lactone.
4. The method of processing cheese comprising adding to the cheese a small amount of a glucono lactone, heating the mass to a temperature high enough to destroy undesirable bacteria contained in the cheese but not sufficiently high to disintegrate the cheese, and maintaining the temperature until the cheese is sterilized.
5. The method of processing cheese comprising adding to the cheese a small amount of a glucono-gamma-lactone, heating the mass to a temperature high enough to destroy undesirable bacteria contained in the cheese but not sufficiently high to disintegrate the cheese, and maintaining the temperature until the cheese is sterilized.
6. The method of processing cheese comprising adding to the cheese a small amount of a glucono-delta-lactone, heating the mass to a temperature high enough to destroy undesirable bacteria contained in the cheese but not sufficiently high to disintegrate the cheese, and maintaining the temperature until the cheese is sterilized.
7. The method of processing cheese comprising adding to the cheese a small amount of glucono-lactone, and a soluble non-poisonous salt selected from the group consisting of citrates, tartrates, phosphates and gluconates, heating the mass to a temperature high enough to destroy undesirable bacteria contained in the cheese but not sufficiently high to disintegrate the cheese, and maintaining the temperature until the cheese is sterilized.
8. The method of processing cheese comprising adding to the cheese from 0.05% to 2.0% by weight of a glucono lactone, heating the mass to a temperature high enough to destroy undesirable bacteria contained in the cheese but not sufficiently high to disintegrate the cheese, and maintaining the temperature until the cheese is sterilized.
9. The method of processing cheese comprising adding to the cheese from 0.05% to 2.0% by weight of glucono-gamma-lactone, heating the mass to a temperature high enough to destroy undesirable bacteria contained in the cheese but not sufficiently high to disintegrate the cheese, and maintaining the temperature until the cheese is sterilized.
10. The method of processing cheese comprising mixing two or more kinds of cheese together, adding to the mixture a small amount of glucono-lactone, heating the mass to a temperature high enough to destroy undesirable bacteria contained in the cheese but not sufficiently high to disintegrate the cheese, and maintaining the temperature until the cheese is sterilized.
11. The method of processing high acidity cheese comprising adding a small amount of glucono lactone to the cheese, heating the mass to a temperature of about 160° F., maintaining said temperature while agitating the mass until it is emulsified and sterilized, and then adding a sufficient amount of a soluble alkaline agent to give the desired hydrogen ion concentration in the finished product.

12. The method of processing high acidity cheese comprising adding a small amount of glucono-gamma-lactone to the cheese, heating the mass to a temperature of about 160° F., maintaining said temperature while agitating the mass until it is emulsified and sterilized, and then adding a sufficient amount of a soluble alkaline agent to give the desired hydrogen ion concentration in the finished product.

13. The method of processing cheese comprising emulsifying cheese with an emulsifying agent, and heating, sterilizing, and adding glucono lactone during the process to control the desired alkalinity.

RICHARD PASTERNACK.
RICHARD W. BURNHAM.